United States Patent
Gao et al.

(10) Patent No.: US 6,727,706 B2
(45) Date of Patent: Apr. 27, 2004

(54) VIRTUAL STEERING OF INDUCTION TOOL FOR DETERMINATION OF FORMATION DIP ANGLE

(75) Inventors: Li Gao, Missouri City, TX (US); Stanley C. Gianzero, Austin, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 09/925,997

(22) Filed: Aug. 9, 2001

(65) Prior Publication Data

US 2003/0030439 A1 Feb. 13, 2003

(51) Int. Cl.⁷ .............................. G01V 3/18; G01V 1/40
(52) U.S. Cl. .......................................... 324/339; 702/7
(58) Field of Search ................................ 324/399, 339; 702/6, 7; 175/45

(56) References Cited

U.S. PATENT DOCUMENTS

| | | | |
|---|---|---|---|
| 3,060,373 A | 10/1962 | Doll | 324/1 |
| 3,808,520 A * | 4/1974 | Runge | 324/6 |
| 4,251,773 A | 2/1981 | Cailliau et al. | 324/347 |
| 4,302,723 A * | 11/1981 | Moran | 324/339 |
| 4,360,777 A * | 11/1982 | Segesman | 324/339 |
| 4,698,911 A * | 10/1987 | Rambow | 33/302 |
| 4,857,852 A | 8/1989 | Kleinberg et al. | 324/339 |
| 4,980,643 A | 12/1990 | Gianzero et al. | 234/339 |
| 5,115,198 A | 5/1992 | Gianzero et al. | 324/339 |
| 5,757,191 A * | 5/1998 | Gianzero | 324/339 |
| 6,044,325 A * | 3/2000 | Chakravarthy et al. | 702/7 |
| 6,393,364 B1 * | 5/2002 | Gao et al. | 702/7 |

FOREIGN PATENT DOCUMENTS

| | | |
|---|---|---|
| EP | 0721111 A | 10/1996 |
| GB | 2367366 A | 3/2002 |

OTHER PUBLICATIONS

"Incorporating Geological Dip Information into Geophysical Inversions", Li et al., GeoPhysics, vol. 65, No. 1, Jan.–Feb. 2000, pp. 148–157.*
"Joint Inversion of Surface and Three–Component Borehole Magnetic Data", Li et al., GeoPhysics, vol. 65, No. 2, Mar.–Apr. 2000, pp. 540–552.*
British Search Report dated Mar. 13, 2003, Application No. GB 0218177.4 (2p.).

* cited by examiner

Primary Examiner—John Barlow
Assistant Examiner—Toan M Le
(74) Attorney, Agent, or Firm—Conley Rose, P.C.

(57) ABSTRACT

A method is disclosed for using a triad induction tool to identify the formation strike and dip angles. The method can be performed in real time. In one embodiment, the method includes: (1) measuring a magnetic coupling between transmitter coils and receiver coils of a tool in the borehole; (2) obtaining from the measured coupling a strike angle between the tool and the formation; (3) applying a rotational transformation to the coupling measurements to correct for the strike angle; and (4) applying a predetermined set of rotational transformations to the coupling to determine coupling term values as a function of rotation angle. A least-squares curve fit or a Hough transform of the derivative of the coupling term values with respect to position may be used to identify the dip angle.

20 Claims, 5 Drawing Sheets

VIRTUAL STEERING OF INDUCTION TOOL FOR DETERMINATION OF FORMATION DIP ANGLE

BACKGROUND

1. Field of the Invention

The present invention generally relates to the measurement of formation dip angle relative to a wellbore. More particularly, the present invention relates to a method for determining the dip angle using a virtually steered induction tool.

2. Description of the Related Art

The basic principles and techniques for electromagnetic logging for earth formations are well known. Induction logging to determine the resistivity (or its inverse, conductivity) of earth formations adjacent a borehole, for example, has long been a standard and important technique in the search for and recovery of subterranean petroleum deposits. In brief, the measurements are made by inducing electrical eddy currents to flow in the formations in response to an AC transmitter signal, and measuring the appropriate characteristics of a receiver signal generated by the formation eddy currents. The formation properties identified by these signals are then recorded in a log at the surface as a function of the depth of the tool in the borehole.

Subterranean formations of interest for oil well drilling typically exist in the form of a series relatively thin beds each having different lithological characteristics, and hence, different resistivities. Induction logging is generally intended to identify the resistivity of the various beds. However, it may also be used to measure formation "dip".

Wellbores are generally not perpendicular to formation beds. The angle between the axis of the well bore and the orientation of the formation beds (as represented by the normal vector) has two components. These components are the dip angle and the strike angle. The dip angle is the angle between the wellbore axis and the normal vector for the formation bed. The strike angle is the direction in which the wellbores axis "leans away from" the normal vector. These will be defined more rigorously in the detailed description.

The determination of the dip angle along the length of the well plays an important role in the evaluation of potential hydrocarbon reservoirs and in the identification of geological structures in the vicinity of the well. Such structural and stratigraphic information is crucial for the exploration, production, and development of a reservoir.

Currently, there are several ways of measuring formation dip: (1) electrode (pad) devices, such as those taught in U.S. Pat. No. 3,060,373, filed June 1959 by H. Doll, and U.S. Pat. No. 4,251,773, filed June 1978 by M. Calliau et al.; and (2) Electric imaging devices. Both require that good electrical contact be maintained during the logging process. Under adverse conditions, such as in oil based mud drilling, or when the borehole is highly rugose, good electrical contact between the pads and the formation is difficult to maintain.

U.S. Pat. No. 4,857,852, filed April 1988 by R. Kleinberg et al., discloses a microinduction dipmeter to overcome the high resistivity of oil-based mud. Kleinberg replaces the electrodes of the resistivity dipmeter with microinduction coil transmitter and receivers. Although it can be used in oil based mud, the high operation frequency (20–30 MHz) means it provides a rather limited depth of investigation. As such, the dipmeter will be adversely affected by unpropitious borehole conditions such as borehole invasion and borehole rugosity.

One way to combat these disadvantages would be the use of an electromagnetic induction dipmeter. Such a dipmeter would preferably operate in those wells where the use of conductive mud is not viable. Furthermore, such an induction dipmeter should have a depth of investigation deep enough to minimize the adverse effects of the borehole geometry and the invasion zone surrounding it ("borehole effect").

An induction dipmeter was first suggested by Moran and Gianzero in "Effects of Formation Anisotropy on Resistivity Logging Measurements" Geophysics, Vol. 44, No. 7, p. 1266 (1979). This dipmeter was deemed not feasible because it possessed a sensitivity to the borehole effect because of the small transmitter-receiver spacing. To overcome this limitation, U.S. Pat. No. 5,115,198, filed September 1989 by Gianzero and Su, proposed a pulsed electromagnetic dipmeter that employs coils with finite spacing. However, even though pulsing the dipmeter does remove the requirement for zero transmitter-receiver spacing, the use of the time-dependent transient signals unduly complicates the design and operation of the tool compared with conventional induction tools running in Continuous Wave (CW).

These attempts to provide a commercial induction dipmeter have thus far not succeeded. An economical yet accurate new technique is therefore needed.

SUMMARY OF THE INVENTION

Accordingly, there is disclosed herein a method of using the various cross-coupling measurements generated by a triad induction tool to identify the formation strike and dip angles. The method virtually rotates the transmitters and receivers, calculates derivatives of the couplings and the dependence of those derivatives on the rotation angle, and based on this dependence, calculates the dip angle of the formation. These calculations can be performed in real time. In one embodiment, the method includes: (1) measuring a magnetic coupling between transmitter coils and receiver coils of a tool in the borehole; (2) obtaining from the measured coupling a strike angle between the tool and the formation; (3) applying a rotational transformation to the coupling measurements to correct for the strike angle; and (4) applying a predetermined set of rotational transformations to the coupling to determine coupling term values as a function of rotation angle. The derivative of the coupling term values with respect to position is postulated to have a functional form in which the dip angle is one of the parameters. A least-squares curve fit or a Hough transform may be used to identify the dip angle.

The disclosed method may provide the following advantages in determining the formation dip angle: (1) As an induction apparatus, the disclosed method can be applied in situations where the condition are not favorable for the focused current pad dipmeters, e.g., in wells drilled with oil based mud or when the wellbore has high rugosity. (2) Only the real part of the voltages need be measured, so measurement of the unstable imaginary signal may be avoided. (3) Since the derivatives of the signals are used, the current method may have a greatly reduced borehole effect. (4) The disclosed method has a deeper depth of investigation than the microinduction pad dipmeter and hence provides a direct measurement of the regional dip that is less vulnerable to adverse borehole conditions.

BRIEF DESCRIPTION OF THE DRAWINGS

A better understanding of the present invention can be obtained when the following detailed description of the preferred embodiment is considered in conjunction with the following drawings, in which.

Figure 1:
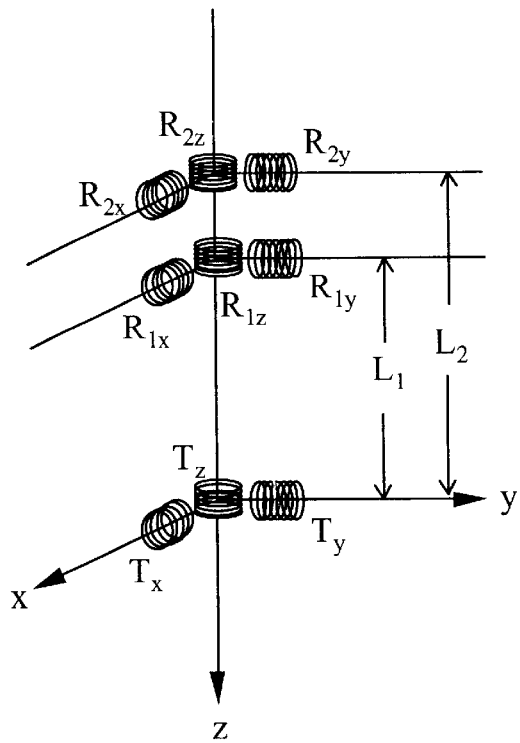
FIG. 1 shows the coil configuration of a triaxial induction tool.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Tool Configuration

Turning now to the figures, FIG. 1 shows a conceptual sketch of a coil arrangement for a downhole induction tool. A triad of transmitter coils $T_x$, $T_y$ and $T_z$, each oriented along a respective axis, is provided. A triad of similarly oriented, balanced, receiver coil pairs ($R_{1x}$, $R_{2x}$), ($R_{1y}$, $R_{2y}$) and ($R_{1z}$, $R_{2z}$) is also provided. The transmitter-receiver spacings $L_1$ and $L_2$, together with the number of turns in each receiver coil, are preferably chosen so as to set the direct coupling between each transmitter and the corresponding combined receiver pairs equal to zero. Hereafter, each of the receiver coil pairs will be treated as a single balanced receiver coil.

For clarity, it is assumed that the three coils in each triad represent actual coils oriented in mutually perpendicular directions, with the z-axis corresponding to the long axis of the tool. However, it is noted that this coil arrangement can be "synthesized" by performing a suitable transformation on differently oriented triads. Such transformations are described in depth in U.S. Pat. No. 6,181,138 entitled "Directional Resistivity Measurements for Azimuthal Proximity Detection of Bed Boundaries" and filed Feb. 22, 1999 by T. Hagiwara and H. Song, which is hereby incorporated herein by reference.

For completeness, transmitters and receivers are shown in along each of the x, y and z axes of the tool. It is noted that there are only six independent couplings among all the transmitter-receiver pairs. Consequently, any configuration having two transmitters and three receivers, or having three transmitters and two receivers is sufficient to generate the dip and strike information. It is further noted that it is not necessary to have the axes of the transmitters and receivers coincide with the axes of the tool.

Figure 2:
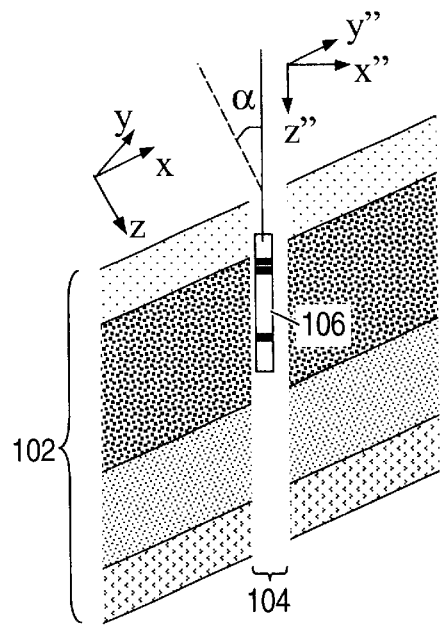
FIG. 2 shows a triaxial induction tool located in a borehole in angled formation beds.
Figure 3:
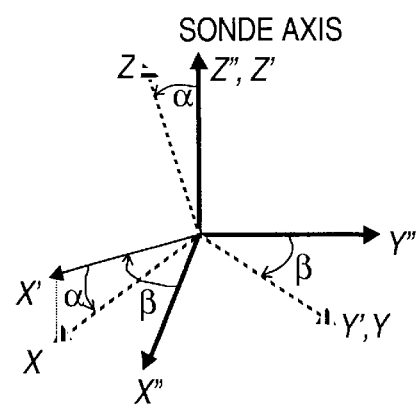
FIG. 3 demonstrates a rotational transformation definition.

FIG. 2 shows a formation having a series of layered beds 102 dipping at an angle. A wellbore 104 passing through the beds 102 is shown containing an induction tool 106. A first (x,y,z) coordinate system is associated with the beds 102, and a second coordinate system (x",y",z") is associated with the induction tool 106. As shown in FIG. 3, the two coordinate systems are related by two rotations. Beginning with the induction tool's coordinate system (x",y",z"), a first rotation of angle $\beta$ is made about the z" axis. The resulting coordinate system is denoted (x',y',z'). Angle $\beta$ is the strike angle, which indicates the direction of the formation dip. A second rotation of angle $\alpha$ is then made about the y' axis. This aligns the coordinate system with the beds. Angle $\alpha$ is the dip angle, which is the slope angle of the beds.

Any vector in one of the coordinate systems can be expressed in terms of the other coordinate system by using rotational transform matrices. Thus, if v" is a vector expressed in the (x",y",z") coordinate system, it can be expressed mathematically in the (x,y,z) coordinate system as:

$$v = R_\alpha R_\beta v'' = R v'' \qquad (1)$$

where $$R = R_\alpha \cdot R_\beta = \begin{bmatrix} \cos\alpha & 0 & -\sin\alpha \\ 0 & 1 & 0 \\ \sin\alpha & 0 & \cos\alpha \end{bmatrix} \begin{bmatrix} \cos\beta & \sin\beta & 0 \\ -\sin\beta & \cos\beta & 0 \\ 0 & 0 & 1 \end{bmatrix} = \begin{bmatrix} \cos\alpha\cos\beta & \cos\alpha\sin\beta & -\sin\alpha \\ -\sin\alpha & \cos\beta & 0 \\ \sin\alpha\cos\beta & \sin\alpha\sin\beta & \cos\alpha \end{bmatrix} \qquad (2)$$

Consequently, given measurements in the coordinate system of the induction tool, the corresponding measurements in the coordinate system of the beds can be determined if the dip and strike angles are known.

Moran and Gianzero, in "Effects of Formation Anisotropy on Resistivity Logging Measurements" Geophysics, Vol. 44, No. 7, p. 1266 (1979), noted that the magnetic field h in the receiver coils can be represented in terms of the magnetic moments m at the transmitters and a coupling matrix C:

$$h = Cm \qquad (3)$$

In express form, equation (3) is:

$$\begin{bmatrix} H_x \\ H_y \\ H_z \end{bmatrix} = \begin{bmatrix} C_{xx} & C_{xy} & C_{xz} \\ C_{yx} & C_{yy} & C_{zz} \\ C_{zx} & C_{zy} & C_{zz} \end{bmatrix} \begin{bmatrix} M_x \\ M_y \\ M_z \end{bmatrix} \qquad (4)$$

Of course, equation (3) is also valid in the induction tool coordinate system, so:

$$h'' = C'' m'' \qquad (5)$$

The relationship between the coupling matrices C and C" can be determined from equations (1), (3) and (5) to be:

$$C''=R^{-1}CR=R_\beta^{-1}R_\alpha^{-1}CR_\alpha R_\beta \tag{6}$$

The induction tool can determine each of the elements of C" from magnetic field measurements. Coupling matrix element $C_{ij}''(i,j=x'',y'',z'')$ is calculated from:

$$C_{ij}''=R_iT_j/m_j \tag{7}$$

where $R_iT_j$ is the magnetic field measured by the ith receiver in response to the jth transmitter, and $m_j$ is the magnetic moment of the jth transmitter. If each of the transmitters has the same magnetic moment m, the coupling matrix can be expressed:

$$C'' = \frac{1}{m}\begin{bmatrix} R_{x''}T_{x''} & R_{x''}T_{y''} & R_{x''}T_{z''} \\ R_{y''}T_{x''} & R_{y''}T_{y''} & R_{y''}T_{z''} \\ R_{z''}T_{x''} & R_{z''}T_{y''} & R_{z''}T_{z''} \end{bmatrix} \tag{8}$$

Note that due to changes in the formation as a function of depth, the coupling constants are also functions of depth.

The strike angle can be determined directly from the measured signals. For example, it can be calculated by:

$$\beta = \tan^{-1}\left(\frac{TzRy}{TzRx}\right) \tag{9}$$

Knowing the strike angle, an inverse $\beta$ rotation can be carried out. Based on equation (6), the coupling matrix becomes:

$$C'''=R_\beta C''R_\beta^{-1}=R_\alpha^{-1}CR_\alpha \tag{10}$$

Accordingly, the signal measurements allow a straightforward determination of coupling matrix C" and strike angle $\beta$. The remaining unknown is the dip angle $\alpha$.

If the dip angle $\alpha$ were known, an inverse $\alpha$ rotation could be done to determine the coupling coefficients in the bed coordinate system. To determine the dip angle, we postulate a correction angle $\gamma$. When a rotation is performed about the y' axis, the coupling matrix becomes:

$$\tilde{C}(\gamma)=R_\gamma C'''R_{\gamma-1}=R_\gamma R_\alpha^{-1}CR_\alpha R_\gamma^{-1} \tag{11}$$

Equations (10) and (11) represent the virtual steering of the transmitters and receivers so that after the rotation, the transmitter and receivers are oriented in a direction that has no strike ($\beta=0$) and a dip angle of $\gamma$.

In studying the behavior of the coupling matrix $\tilde{C}(\gamma)$, it has been found that the derivatives of certain elements can be used to identify the dip angle $\alpha$. The first and second derivatives of $R_xT_x(\gamma)$ as a function of depth z can usually be represented as:

$$C'_{xx}(\gamma) = \frac{\partial}{\partial z}[R_xT_x(\gamma)] = A\cos(2(\gamma-\alpha)) + B \tag{12}$$

$$C''_{xx}(\gamma) = \frac{\partial^2}{\partial z^2}[R_xT_x(\gamma)] = C\cos(2(\gamma-\alpha)) + D \tag{13}$$

where A, B, C and D are not functions of $\gamma$. The derivatives of $R_zT_z(\gamma)$ can also be represented in the same form, albeit with different constants. This form does not apply when the sonde is straddling an interface between formation beds.

Figure 5:
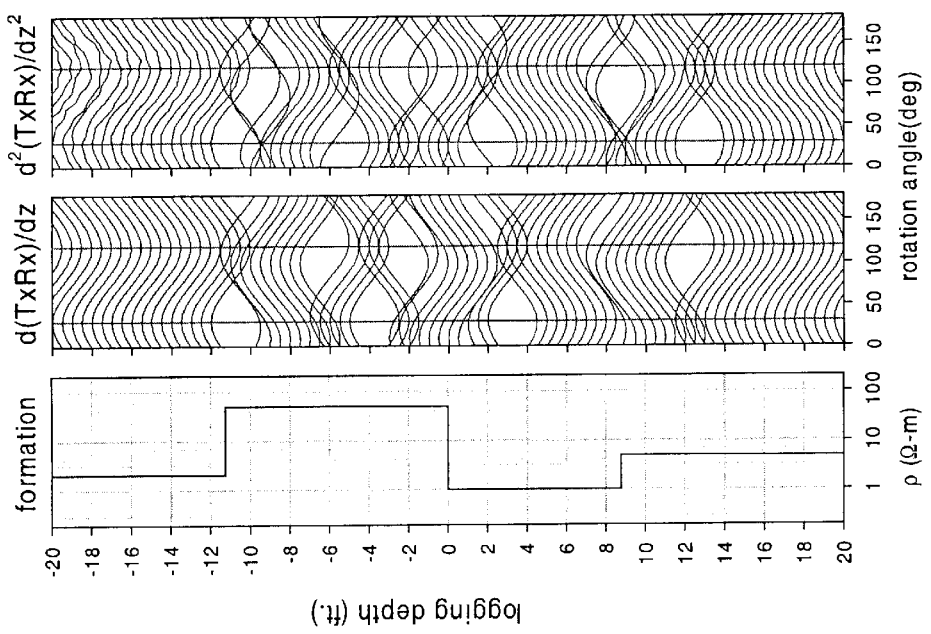
FIG. 5 shows a graph used to illustrate the shape of position derivatives of the magnetic coupling between a transmitter and a receiver.

FIG. 5 shows a resistivity log of a model formation showing four beds of different resistivities. Adjacent to the resistivity log are plots of derivatives of $R_xT_x(\gamma)$ confirming the form of equations (12) and (13). These are calculated using the response of a generic 3-coil triad sonde as it is logged in a dipping formation having a 30° dip and 40° strike. After all data has been acquired, at each logging point the sonde is virtually steered to arrive at the derivatives as a function of the rotation angle. The amplitudes of the derivatives at each logging position have been normalized and resealed according to depth for plotting purposes.

Because the form of the derivatives as a function of correction angle $\gamma$ is known, the unknowns A, B and $\alpha$, or C, D and $\alpha$, can be determined when the derivatives are plotted as a function of the correction angle $\gamma$. Accordingly, coupling coefficient measurements may be taken, rotated to correct for the strike angle $\beta$, and rotated through a series of correction angles $\gamma$ to obtain depth logs of $R_xT_x(\gamma)$. The set of correction angles may be predetermined, e.g. 0, 10°, 20°, 30°, . . . , 180°. The depth logs may then be differentiated with respect to depth to obtain the first and/or second derivatives.

Figure 6:
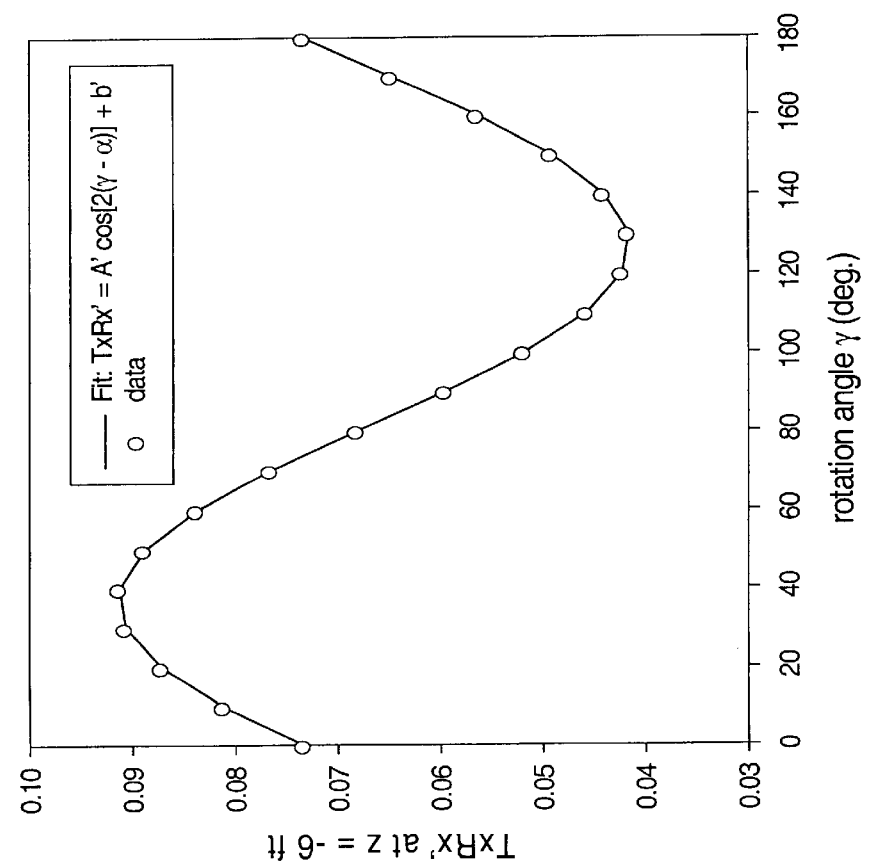
FIG. 6 shows a minimum square error curve fit to the position derivative data points.

The derivatives, if plotted as a function of correction angle $\gamma$, would have the form of equations (12), (13). The dip angle $\gamma$ may consequently be calculated from the derivatives in several ways. For example, a simple least-squares curve fit to the data would work, as shown in FIG. 6. Another method with may be used involves a Hough transform. The use of the Hough transform is discussed by D. Tores, R. Strickland and M. Gianzero, "A New Approach to Determining Dip and Strike Using Borehole Images", SPWLA 31$^{st}$ Annual Logging Symposium, Jun. 24–27, 1990.

First the bias is removed. In equations (12) and (13), the constants B and D represent the bias. The bias can be largely eliminated by identifying the maximum and minimum values, and subtracting the average of the maximum and minimum values. Thus pure cosine functions y'($\gamma$) and y"($\gamma$) found by:

$$y'(\gamma) = C'_{xx}(\gamma) - \frac{1}{2}[\max(C'_{xx}(\gamma))-\min(C'_{xx}(\gamma))] = A\cos(2(\gamma-\alpha)) \tag{14}$$

$$y''(\gamma) = C''_{xx}(\gamma) - \frac{1}{2}[\max(C''_{xx}(\gamma))-\min(C''_{xx}(\gamma))] = C\cos(2(\gamma-\alpha)) \tag{15}$$

where max and min denotes the maximum and minimum values in the interval $0° \leq \gamma \leq 180°$.

Equations (14) and (15) can be parameterized, i.e. one of the unknowns can be written as a function of the other unknown. For example:

$$A(\alpha) = \frac{y'(\gamma)}{\cos(2(\gamma-\alpha))} \tag{16}$$

$$C(\alpha) = \frac{y''(\gamma)}{\cos(2(\gamma-\alpha))} \tag{17}$$

Figure 7:
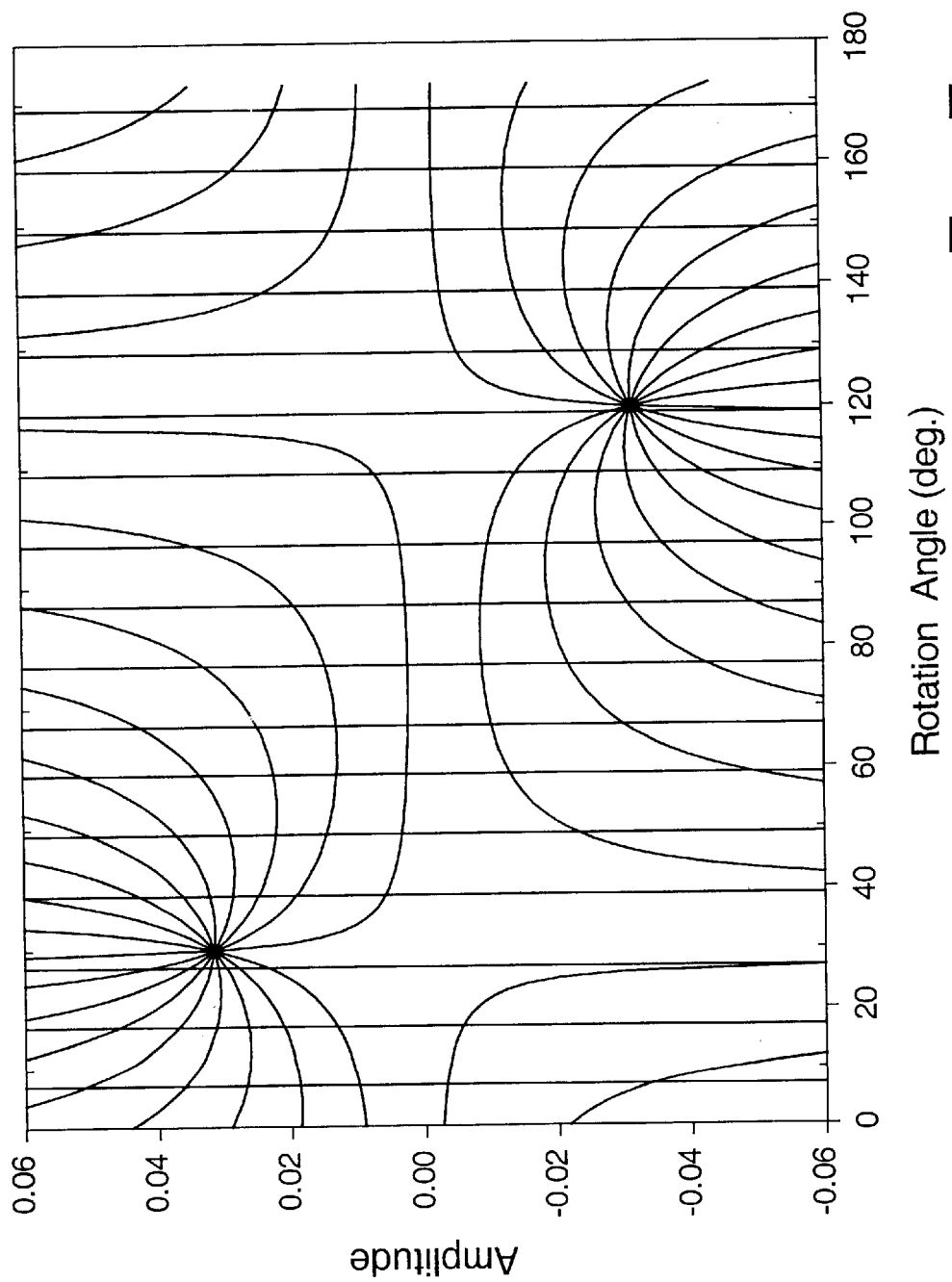
FIG. 7 shows a Hough transform of the data points using a parameterized cosine function.

In words, given a known correction angle $\gamma$ and a known corresponding value y'($\gamma$) or y"($\gamma$), the amplitude A or C is a function of the dip angle $\alpha$. There may be multiple values of A or C for a given dip angle. Each combination of correction angle $\gamma$ and corresponding value y'($\gamma$) gives a different A($\alpha$) curve. FIG. 7 shows a set of A($\alpha$) curves for nine different values of correction angle $\gamma$. This is the Hough transform of measurement data satisfying equation (14).

One concern with using the Hough transform is the size of transform space that must be considered. As the range of the parameters is increased, the computational requirements are increased. It is expected that the range of the amplitude parameter can be limited to between twice the maximum value of y'(γ) and twice the minimum value of y'(γ), or between twice the maximums and minimums of y"(γ) when the second derivative is being used.

Of particular interest in FIG. 7 are the intersection points of the various curves. The two intersection points represent amplitude A and dip angle α values that are valid for each of the data points. Accordingly, they specify a curve that passes through each of the points, and the dip angle value has been determined for this depth. Although there are two solutions, they are equivalent, i.e. an inversion in the amplitude is equivalent to a 180° phase shift. Accordingly, the solution with α>90° may be ignored. The process is repeated for each logging depth to obtain a log of dip angle versus depth.

The intersections may be found by quantizing the parameter space into bins, and counting the number of curves that pass through each bin. The bins with the highest number of curves contain the intersections. More detail on the use of Hough transforms may be found in many standard reference texts.

Figure 4:
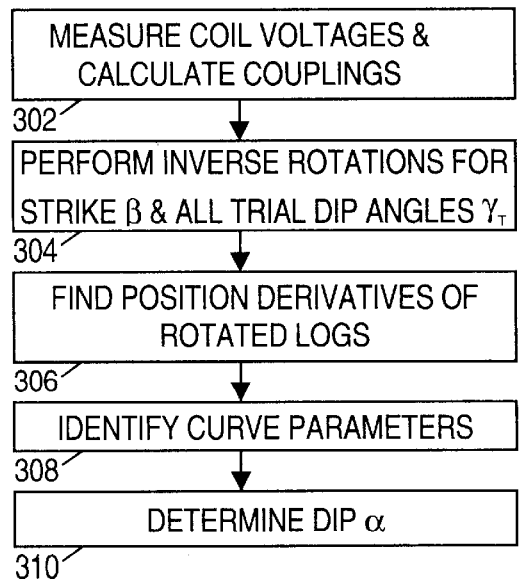
FIG. 4 shows a flow diagram for the disclosed method of determining dip angles in a dipping earth formation.

FIG. 4 shows a flowchart of this method. In block 302, the transmitters are sequentially fired, the receiver signals are measured, and the coupling matrix elements in equation (8) are calculated. In block 304, the inverse β-rotation is performed on the coupling matrix. A set of dip-correction γ-rotations is then applied to the matrix to determine a set of terms (either $R_xT_x(\gamma)$ or $R_zT_z(\gamma)$) as a function of logging tool position. In block 306, the selected set of terms is differentiated with respect to position to determine either the first or second derivative. In block 308 a curve parameter identification technique is performed on the set of differentiated terms. This technique may be curve fitting, a Hough transform, or some other technique. In block 310, the identified curve parameters are used to calculate the dip angle α. A dip angle is determined for each tool position in the borehole.

Figures 8, 9, 10:
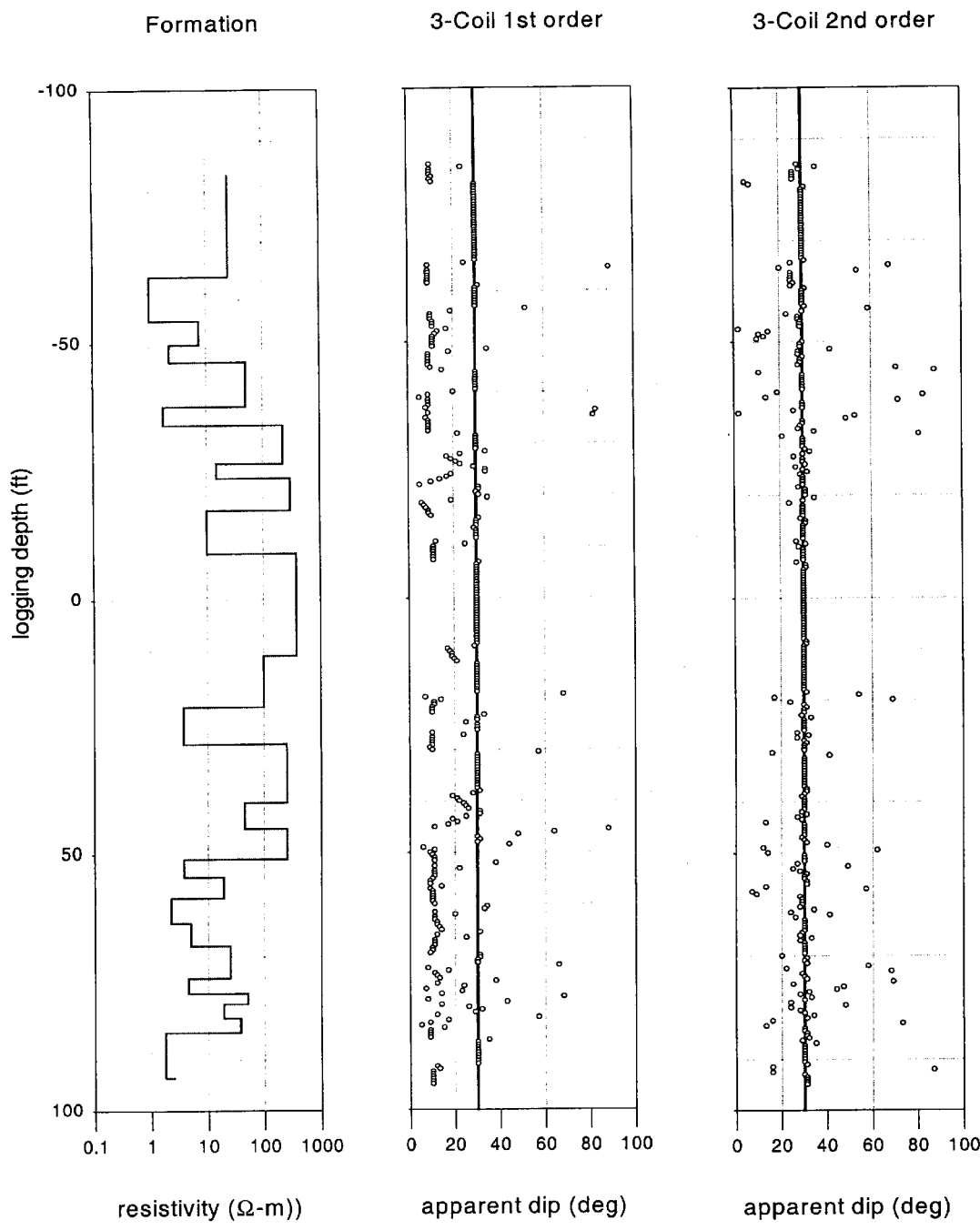
FIG. 8 shows a resistivity log of a model bedded formation.
FIG. 9 shows a dipmeter log calculated from the first derivative of the coupling.
FIG. 10 shows a dipmeter log calculated from the second derivative of the coupling.
Figures 11, 12:
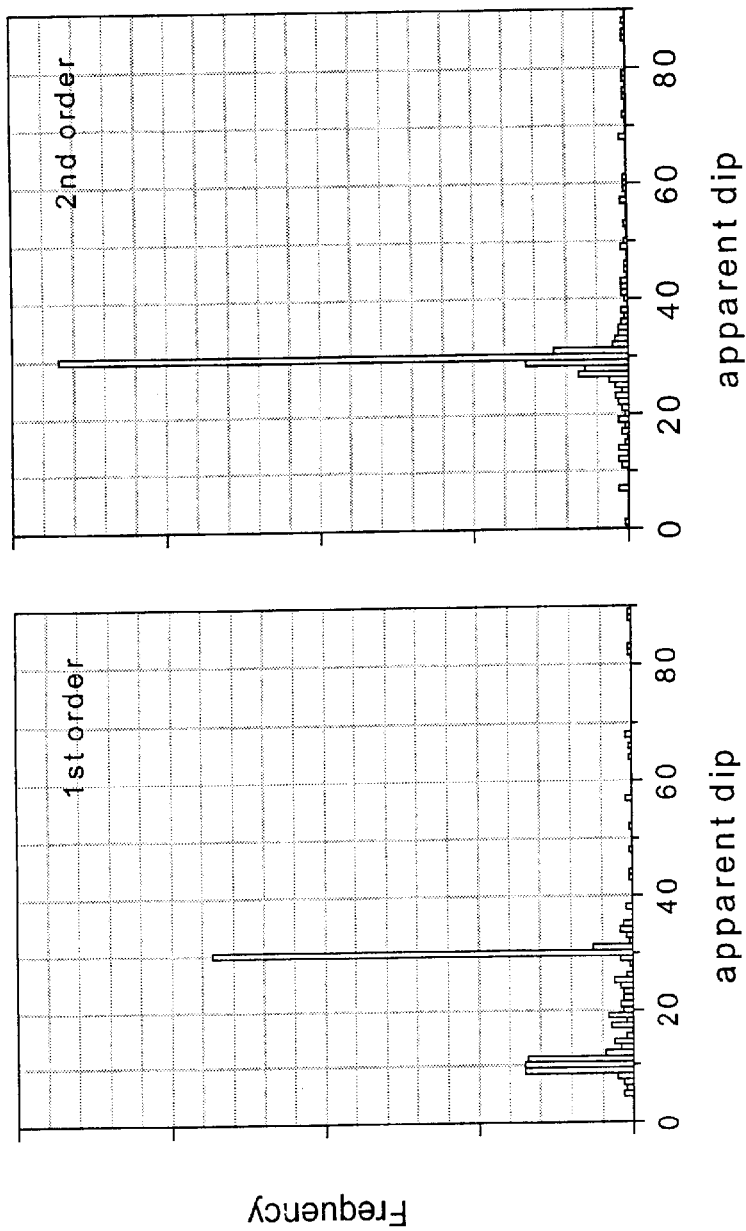
FIG. 11 shows a histogram of the dipmeter log of FIG. 9.
FIG. 12 shows a histogram of the dipmeter log of FIG. 10.

A comparison of the results of using the first and second derivatives to calculate dip angle is now made. FIG. 8 shows a resistivity log of a model formation. The model formation has beds that dip at 30° across the borehole. FIG. 9 shows the dip angle calculated for the model formation using the first derivative. In the neighborhood of bed interfaces between low-resistivity beds, the calculated angle deviates downward from the true dip, but is generally accurate for thicker beds. FIG. 10 shows the dip angle calculated for the same formation using the second derivative. While there is some scatter in the neighborhood of thin beds, the dip calculation is generally quite accurate. FIG. 11 shows a histogram of the dip angle results in FIG. 9, and FIG. 12 shows a histogram of the dip angle results in FIG. 10. The first derivative method shows a false peak at 10° as well as a peak at the true dip of 30°. In the second derivative, the false peak is absent.

The disclosed method can be utilized to determine regional dip and strike information in wells where conditions are not favorable for the operation of traditional resistivity wireline dipmeters or resistivity imaging tools. Such conditions include, but are not limited to, wells drilled with oil based mud and wells with highly rugose wellbores. It is noted that the disclosed method can be used for both wireline operations and Logging While Drilling (LWD) operations. In LWD operations, the method, in addition to determining regional dip and strike, can be further used to facilitate geosteering in highly deviated and/or horizontal wells.

The new method may provide the following advantages: (1) As an induction apparatus, the current invention can be applied in situations where the condition are not favorable for the focused-current pad dipmeters, e.g., in wells drilled with oil based mud or when the wellbore has high rugosity. (2) Only the real part of the receiver voltages need to be measured. Consequently measuring of the unstable imaginary signal can be avoided all together. (3) Since the derivatives of the signals are used, the disclosed method should have greatly reduced borehole effect compared to the original method. (4) The disclosed apparatus may provide a deeper depth of investigation than the microinduction pad dipmeter, and hence may be less vulnerable to adverse borehole conditions.

Numerous variations and modifications will become apparent to those skilled in the art once the above disclosure is fully appreciated. It is intended that the following claims be interpreted to embrace all such variations and modifications.

What is claimed is:

1. A method for determining a dip angle of a formation with respect to a borehole in the formation, wherein the method comprises:

measuring a magnetic coupling between transmitter coils and receiver coils of a tool in the borehole, wherein the coupling is expressible as a coupling matrix in a tool coordinate system;

obtaining from the measured coupling a strike angle between the tool and the formation;

applying a rotational transformation to said coupling matrix to correct for the strike angle; and applying a set of rotational transformations to said coupling matrix to determine a set of one or more coupling term values as a function of predetermined rotation angle values about a given axis.

2. The method of claim 1, wherein one of the coupling term values in the set is proportionate to a $R_xT_z(\gamma)$ term of the coupling matrix, and wherein y ranges over the predetermined rotation angle values.

3. The method of claim 1, wherein one of the coupling term values in the set is proportionate to a $R_zT_z(\gamma)$ term of the coupling matrix, and wherein y ranges over the predetermined rotation angle values.

4. The method of claim 1, further comprising:

differentiating the one or more coupling term values with respect to tool position to determine a coupling term derivative as a function of rotation angle.

5. The method of claim 4, wherein the coupling term derivative is a first-order derivative of the coupling term values with respect to tool position.

6. The method of claim 4, wherein the coupling term derivative is a second-order derivative of the coupling term values with respect to tool position.

7. The method of claim 4, further comprising:

determining parameters of a curve that matches the coupling term derivative as a function of rotation angle, wherein at least one of the parameters is indicative of the dip angle of the formation.

8. The method of claim 7, wherein the curve is expressible as y(γ)=A cos(2(γ-α))-)) B, and wherein A, B, and Q are parameters that are constant with respect to y.

9. The method of claim 7, wherein the determining includes:

performing a least-squares curve fit of a sinusoid to the coupling term derivative.

10. The method of claim 7, wherein the determining includes:

removing a bias from the coupling term derivative;

performing a Hough transform on the coupling derivative;

identifying a parameter solution from the Hough transform, wherein the solution includes a dip angle value.

11. The method of claim 7, further comprising:

determining a dip angle of the formation for each of multiple tool positions in the borehole;

doing a histogram of the dip angle; and identifying a dip angle value corresponding to a peak in the histogram.

12. The method of claim 1, wherein the tool is an induction tool having a triad of mutually orthogonal transmitters.

13. The method of claim 1, wherein the receiver coils include at least one triad of mutually orthogonal receivers.

14. The method of claim 1, wherein said measuring includes exciting each transmitter coil in turn and measuring voltage signals induced in each of the receiver coils by each of the transmitter coils.

15. A method for determining a dip angle of a formation, wherein the method comprises:

receiving multiple sets of magnetic coupling measurements from an induction tool, wherein each set of magnetic coupling measurements has an associated tool position; and for each set of magnetic coupling measurements:

obtaining from the set of magnetic coupling measurements a strike angle of the formation;

compensating the set of magnetic coupling measurements for the strike angle; and manipulating the set of magnetic coupling measurements to produce a coupling term value for each of a set of predetermined dip angle values.

16. The method of claim 15, wherein the set of predetermined dip angle values includes at least three different values.

17. The method of claim 15, wherein the coupling term values are indicative of the coupling strength between a virtually-steered transmitter-receiver pair oriented in parallel.

18. The method of claim 15, further comprising:

determining a derivative of the coupling term values with respect to tool position, wherein the derivative has a known form of dependence on dip angle compensation; and determining parameters of the known form of dependence that provide a best match with the derivative of the coupling term values, wherein at least one of the parameters is indicative of the dip angle of the formation.

19. The method of claim 15, further comprising:

determining a second derivative of the coupling term values with respect to tool position, wherein the second derivative has a known form of dependence on dip angle compensation; and determining parameters of the known form of dependence that provide a best match with the second derivative of the coupling term values, wherein at least one of the parameters is indicative of the dip angle of the formation as a function of tool position.

20. The method of claim 19, further comprising:

determining a dip angle of the formation for each of multiple tool positions in the borehole;

doing a histogram of the dip angle; and identifying a dip angle value corresponding to a peak in the histogram.

* * * * *